United States Patent Office 3,076,530
Patented Feb. 5, 1963

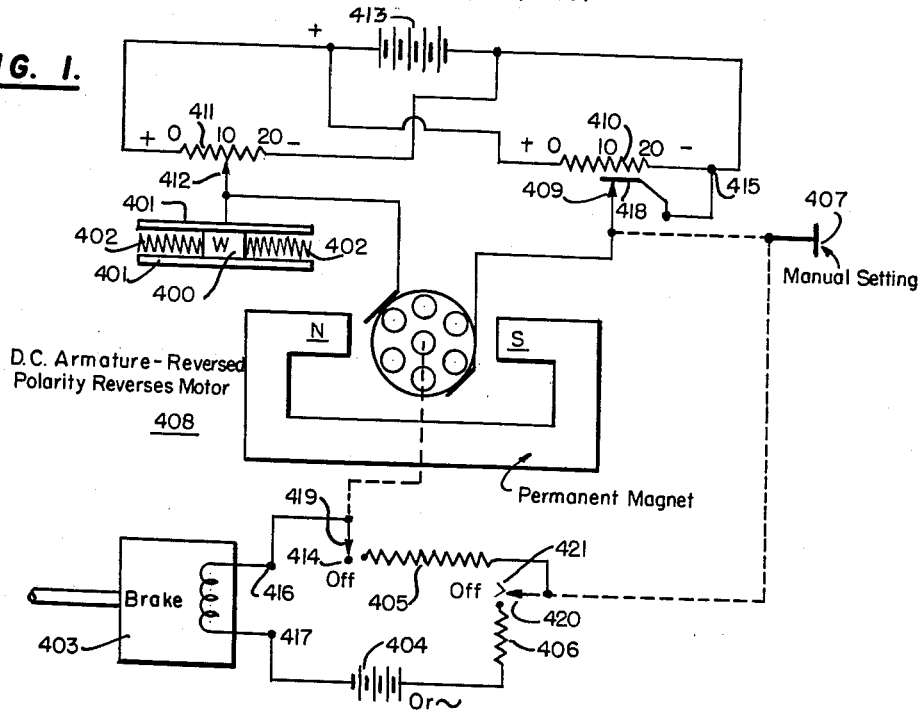

3,076,530
AUTOMATIC TRANSMISSION AND IMPROVED
BRAKING SYSTEMS
Benton Hall Schaub, Gambrills, Md.
Filed May 29, 1957, Ser. No. 662,501
6 Claims. (Cl. 188—181)

This invention concerns improvements in power brakes, both for light and very heavy applications, as well as automatic and special controls for brakes and braking applications.

It is an object of the invention to provide a magnetic particle brake.

It is an object of the invention to provide a magnetic particle brake which is automatic in action and maximizes or approximately maximizes the braking effect.

It is an object of the invention to provide a vehicular brake which can be applied with a minimum of dead time or reaction time which usually elapses before brakes are actually applied even though the operator intends throughout the period in question to apply the brakes or to take related action.

It is an object of the invention to eliminate a large part of the delay in operation arising from the reaction time of the operator.

It is an object of the invention to provide a magnetic particle brake which will not grab or lock the wheel unless the operator wishes such action.

The magnetic material employed herein may comprise one or more of the following materials alone or as alloys: iron, carbonyl iron, magnetite, steels of various kinds, nickel, cobalt, manganese, titanium, aluminum, chromium and the like. Various alloys may be employed such as al-ni-col, permalloy or alfenal, an aluminum-iron combination. Bismuth may be used because of its dimagnetic properties. Magnetic alloys containing chromium, nickel, tungsten for example resist oxidation and corrosion. Carbon in the steels for example hardens the particles to resist erosion and crumbling. Tungsten and nickel increase the hot strength of the particles. Copper or silver may be added to increase the heat conductivity of the mass. Beryllium may be added to harden the copper.

The various materials listed having the necessary magnetic properties may be used alone as a powder, colloidal particles, filings, finely divided material or particles of various shapes and sizes. The materials may be separately powdered and used as a dry mixture or alloyed to achieve the desired characteristics. Mixtures in some cases yield improved magnetic properties, increased Curie point, better release on removal of the magnetic field, longer active life under load, better heat dissipation, resistance to corrosion and erosion. The The heavier automotive, ship and railway applications require far more care in selection while the light control applications operate well with almost any reasonable magnetic materials.

It is an object of the invention to provide a braking system which automatically controls the braking action by inertia means so that the braking effect may be maintained at a high value without locking of the wheels.

It is an object of the invention to provide a magnetic particle vehicular braking system which automatically controls the effective impedance of the braking control circuit by inertial means.

It is an object of the invention to provide a magnetic particle vehicular braking system having a balanced voltage control circuit and inertial means for adjusting the balance of the circuit and the braking action to prevent locking of the vehicle wheels and to maintain the braking action at a high level.

The present application is a continuation-in-part of my copending application Serial No. 535,012 filed September 19, 1955, now abandoned for "Automatic Transmission and Braking Systems" and of its parent application, now U.S. Patent No. 2,718,157 granted September 20, 1955 for "Automatic Transmission." Reference is made to my co-pending application Serial No. 662,412 filed May 29, 1957.

In the drawings like numerals refer to like parts throughout.

FIGURE 1 is a schematic diagram of one form of the invention utilizing direct current control.

FIGURE 2 is a modified form of the invention utilizing inductive loading in an alternating current control circuit.

A magnetic particle brake rate control according to the invention is shown in FIGURE 1 wherein a weight 400 is constrained vertically by guide bearing rails 401 and resiliently constrained longitudinally in line with the fore and aft axis of the vehicle on which the control is mounted by the opposed pair of springs 402. Magnetic particle brake 403 comprises relatively movable members with magnetic particles in the space between the members and in contact with them. One of the members is mounted to rotate with a disc, drum or shaft which it is desired to brake, and the other member is fixed to the frame or otherwise held. A magnetic field established by the energizing field coil of brake 403 causes the magnetic particles to cohere in direct proportion to the flow of current through the coil. The coherence of the particles resists relative displacement thereof by the relatively movable members in contact with the particles as a direct function of the applied magnetic field. The function is reasonably linear and substantially continuous, providing acceptably precise control of braking effort throughout the entire range from zero braking effort to maximum. The wheels are not locked during brake rate control by the invention, but braking effort can be maximized until the vehicle is brought to a standstill whereupon the wheels may be locked if desired. For parking or other extended periods of standstill, it is usually desirable to lock the wheels.

The coils of brakes 403 are energized by power source 404 under the control of resistances 405 and 406. Resistance 406 is controlled mechanically by the manual brake lever 407. Resistance 405 is controlled by reversible direct current motor 408. Manual lever 407 controls a movable contact 409 which is connected to one side of the armature of motor 408. Contact 409 slides on the left half of resistance 410 making it a variable resistance. During the right half of the travel of contact 409 it slides on contact bar 418 which stands clear of resistance 410 and is connected to junction 415 at the right end of resistance 410 which remains in the control circuit to be described below and balances a resistance 411. Resistances 410 and 411 are connected with reversed polarity to battery 413.

Movable contact 412 is carried by weight 400 and slides in contact with resistance 411, being normally centered by springs 402 when the system is free of acceleration forces. Contact 412 is connected to the other side of the armature of motor 408 which is reversibly operated from the power source 413 in a direction determined by the polarity of the resultant voltage impressed across the armature and at a speed determined by the value of that resultant voltage.

With the vehicle at rest or traveling at constant speed with zero acceleration, contact 412 will be centered on resistance 411 by the opposed pair of springs 402 and the potential applied to contact 412 will be half the total potential applied by power source 413 across the resistance 411. The manually operated contact 409 will be positioned on contact bar 418 which stands free from and extends substantially to the center of resistance 410. Contact bar 418 is connected to the negative side of power source 413 so that the contact 409 will be at a negative potential with respect to the voltage on contact 412. The resultant potential impressed across the armature of motor 408 causes it to run in a direction which moves contact 419 on resistance 405 to the left, placing all of resistance 405 in the circuit of brake 403. As shown in the drawing, contact 419 may be moved to an off position such as 414 which is disconnected from the circuit of the coil of brake 403, thus breaking this circuit.

The contact bar 418 and the connection at junction 415 assures the operation of motor 408 and the return of contact 419 to the left terminal of resistance 405 or to disconnect position 414 under conditions of zero acceleration because of the resultant voltage which is impressed across the armature of motor 408 as soon as contact 409 leaves the resistance 410 and slides on contact bar 418. To assure this action, contact 409 may be resiliently mounted and manual setting lever 407 provided with a spring bias which moves both contact 409 from resistance 410 onto contact bar 418 and contact 420 from resistance 406 to disconnected off position 421.

When braking is required manual lever 407, which may take the form of the usual automobile brake pedal, is moved to the left until contact 420 rests on resistance 406. Where contact 419 is at the left end of resistance 405, initial movement of contact 421 closes the circuit of power source 404 energizing the coil of brake 403, and further movement of contact 421 directly reduces the resistance 406 in the braking circuit and increases the braking effort of brake 403.

Continued movement of lever or pedal 407 places contact 409 on resistance 410 which is positive with respect to the center position of resistance 411, producing a resultant voltage across the armature of motor 408 of a polarity which causes motor 408 to drive contact 405 to the right, reducing the resistance 405 in the braking circuit and further increasing the braking effort of brake 403.

When the vehicle decelerates at a rate sufficient to cause the inertia of mass 400 to move the contact 412 on resistance 411, the resultant voltage across the armature of motor is adjusted until the voltage at contact 409 is balanced and the resistance in the circuit of the coil of brake 403 will not be further reduced. Where vehicular deceleration is so great that there is likelihood that the wheels may lock and cause skidding, the weight 400 moves contact 412 on resistance 411 to reverse the polarity across the armature of motor 408 and produce a resultant voltage which is a function of the deceleration thus producing a rate control of the braking effort. Motor 408 then increases resistance 405 by an amount necessary to decrease the braking effort and the resultant vehicular deceleration sufficiently to assure that the vehicle wheels do not lock and produce skidding. The constants of springs 402, the mass of weight 400, and the circuit constants are so chosen that an effective result is obtained. Adjustment may of course be provided to allow variation in the performance of the control to suit individual vehicles, operator preference and road or traffic conditions.

Where a disconnected terminal position 414 is employed, initial braking effort is not effected until contact 409 rests on resistance 410 in a position such as will produce a resultant voltage across the armature of motor 408 which operates just enough to move contact 419 to the left end of resistance 405 to close the circuit of brake 403. For this construction the positions of contacts 409 and 420 may be adjusted so that contact 409 slides off contact bar 418 and onto the center of resistance 410 at the same time contact 420 is moved to the free end of resistance 406, closing that open circuit.

As soon as lever 407 or pedal 407 is moved toward its righthand position braking effort is decreased until it reaches zero when contact 420 is moved to disconnected position 421 and the circuit of power source 404 is broken. Contact 419 is moved to the free end of resistance 405 or to disconnected off position 414 as soon as contact 409 leaves resistance 410 and slides onto contact bar 418, thus energizing motor 408 in the proper polarity to produce this movement.

FIGURE 2 shows a modified form of the invention which simplifies the construction by replacing weight 400 with a slug of permeable material 450 which is similarly centered by opposed spring pair 451 between or through transformer primary coil 452 and semi-reversed secondary coil 453 and so positioned that the effective inductance of these coils is affected by the position of slug 450. By utilizing inductive devices as selector and detector, simple A.C. design is possible.

A manually set permeable slug 454 is positioned between or through primary coil 455 and semi-reversed secondary coil 456 by manual setting lever or brake pedal 463. Semi-reversed coils 453 and 456 are connected across the armature of reversible motor 457 which drives a movable contact 458 slidable on resistance 459 in the energizing circuit of the field producing coil of magnetic particle brake 460 which corresponds to brake 403.

A.C. power for the armature of motor 457 is supplied from source 470. Main control coils 452 and 455 are connected in parallel across source 470 at junctions 417 and 472. Semireversed coils 453 and 456 are connected in series across armature leads 465 and 466 of reversible motor 457 at junctions 471 and 473. Motor 457 is not series wound, but employs two independent windings which make it reversible. Using a single A.C. source 470 for both field and armature the source phase establishes instantaneous magnetic polarity in the field and the polarity of the armature is varied by the positional relation between permeable slugs 450 and 454 and their respective reversed secondary coils 453 and 456.

Contact 458 is returned to disconnected off position 461, breaking the energizing circuit of brake 460 at the free end of resistance 459, by contact 462 mounted on manual lever or brake pedal 463 and connected to junction 472. The energizing circuit of FIGURE 2 is completed by contact bar 474 which is connected to junction 473 through current limiting resistance 475. The armature leads 465 and 466 are connected respectively to junctions 471 and 473. When manual lever 463 is moved to its righthand position of zero braking demand under the action of a suitable bias spring upon release of lever or pedal 463 by the operator or the manual shift of lever 463 to zero brake demand by the operator, contact 462 closes the return circuit at contact bar 474, placing the armature of motor 457 across A.C. power supply 470 and causing motor 457 to move contact 458 to the left to disconnected off position 461 and breaking the energizing circuit of the field coil of brake 460 at the free end of resistance 459. The load on motor 457 is so small that its response is substantially instantaneous and the current is sufficiently limited by resistance 475 so that the armature can remain across the line or source 470 indefinitely without burn out or harm to the armature from over-heating. The applied voltage maintains contact 458 in off position 461 without regard to any displacement of slug 450 by acceleration forces as long as contact 462 touches bar 474 and closes the zeroizing circuit of motor 451.

When the operator places a braking demand upon the system by moving lever or pedal 463 to the left the zeroizing circuit is broken by movement of contact 462 away from bar 474 and permeable slug 454 is displaced to the left, unbalancing the voltages induced in the reversed halves of secondary coil 456. If slug 450 is assumed to be free from displacing acceleration forces it is centered by springs 461 in secondary 453 and the opposing voltages induced in the reversed halves of coil 453 cancel out, leaving a resultant voltage across the armature leads 465 and 466 which causes motor 457 to move contact 458 from off position 461 into contact with resistance 459. This movement of contact 458 completes the energizing circuit of brake 460 which acts to decelerate the vehicle and displaces permeable slug 450 in reversed secondary 453, producing a resultant voltage which opposes the resultant voltage of secondary 456 because primary coils 452 and 455 are connected across source 470 with their terminals reversed.

Contact 458 is positioned on resistance 459 at the point which causes the resultant voltage of semi-reversed secondary 453 to balance out the resultant voltage across semi-reversed secondary 456 and produce a zero resultant. As the frequency of the voltage applied to the field and to the armature is the same, the direction of rotation of the motor 457 is determined by the dominating phase of the resultant of the voltages produced by the opposed semi-reversed secondary coils connected in series and energized in opposite phase by their respective reversely connected primary coils. The relative displacements of the permeable slugs 450 and 454 vary the polarity of the applied armature voltage with respect to the established instantaneous polarity of the field as determined by the common A.C. source 470.

The schematic circuit diagrams of FIGURES 1 and 2 are intended to be illustrative of operable forms of the invention and have been greatly simplified for clarity of presentation of the theory of operation of the invention. These diagrams are not intended to be construed as limiting because considerations such as cost of quantity production, reliability of operation, ease of servicing, availability of parts, standardization, and related commercial as well as engineering considerations will determine the actual selection and arrangement of the component elements comprising any commercial embodiments of the present invention.

While there have been described above what are at present considered to be the preferred embodiments of the invention, it will be apparent to those skilled in the art that various changes and modifications may be made therein, in the light of the above disclosure, without departing from the spirit or scope of the invention. Accordingly, the appended claims have been variously worded in generic terms to include all those modifications and equivalent structures which fall within the true spirit of the invention.

I claim:

1. In a vehicle brake system, a magnetic particle brake comprising an electrical means for producing a magnetic field for operating said brake, an electrical supply for said brake, an electrical control system for controlling said supply, said control system comprising an electrical bridge circuit having a manually variable impedance and a deceleration sensing impedance wherein an unbalancing of said bridge effects the electrical supply to said brake.

2. The combination set for in claim 1, said decelerating sensing impedance comprising a mass mounted for movement of translation and means to restore said mass to a position representing zero deceleration.

3. The combination set forth in claim 2, said electrical bridge circuit comprising impedance coils, said mass comprising an elongate slug of permeable material mounted for movement in impedance varying relation with respect to said impedance coils.

4. The combination set forth in claim 3, said impedance coils comprising multiple windings portions of which receive said slug as a movable core, said electrical control system comprising a reversible electric motor connected to said bridge circuit, said electrical supply for said brake comprising rheostat means controlled by said motor.

5. The combination set forth in claim 1, said electrical supply comprising a battery having a variable impedance in its circuit, said control circuit comprising a reversible electric motor for varying said variable impedance, said motor being connected to said bridge circuit and controlled thereby.

6. A vehicular brake system comprising a magnetic particle brake, electrical means for producing a magnetic field for operating said brake, electrical supply means for said brake and an electrical control system for controlling said electrical supply means, said control system comprising an electrical bridge circuit having a deceleration sensing impedance, a second impedance and a reversible servomotor means connected to vary the effective output of said electrical supply means in response to the unbalancing of said bridge.

References Cited in the file of this patent

UNITED STATES PATENTS

| | | |
|---|---|---|
| 1,661,625 | Pieper | Mar. 6, 1928 |
| 2,035,047 | Cotter | Mar. 24, 1936 |
| 2,084,171 | Volkers | June 15, 1937 |
| 2,107,984 | Harper | Feb. 8, 1938 |
| 2,117,078 | Brauer | May 10, 1938 |
| 2,377,318 | Born et al. | June 5, 1945 |
| 2,529,985 | Williams | Nov. 14, 1950 |
| 2,538,796 | Oetzel | Jan. 23, 1951 |
| 2,575,360 | Rabinow | Nov. 20, 1951 |
| 2,690,241 | Bachman | Sept. 28, 1954 |
| 2,695,675 | Frye | Nov. 30, 1954 |
| 2,718,157 | Schaub | Sept. 20, 1955 |
| 2,856,036 | Mullen | Oct. 14, 1958 |

FOREIGN PATENTS

| | | |
|---|---|---|
| 354,013 | Great Britain | Aug. 6, 1931 |
| 783,477 | France | Apr. 8, 1935 |